United States Patent
Wanstedt et al.

(10) Patent No.: US 9,549,351 B2
(45) Date of Patent: Jan. 17, 2017

(54) METHODS AND NODES FOR FAST HANDOVER USING PRE-ALLOCATION OF RESOURCES IN TARGET NODES

(75) Inventors: Stefan Wanstedt, Lulea (SE); Min Wang, Lulea (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 45 days.

(21) Appl. No.: 14/423,788

(22) PCT Filed: Aug. 30, 2012

(86) PCT No.: PCT/SE2012/050921
§ 371 (c)(1),
(2), (4) Date: Jul. 4, 2015

(87) PCT Pub. No.: WO2014/035304
PCT Pub. Date: Mar. 6, 2014

(65) Prior Publication Data
US 2015/0312815 A1    Oct. 29, 2015

(51) Int. Cl.
*H04W 36/00* (2009.01)
*H04W 24/10* (2009.01)
*H04W 72/04* (2009.01)

(52) U.S. Cl.
CPC ......... *H04W 36/0077* (2013.01); *H04W 24/10* (2013.01); *H04W 72/044* (2013.01); *H04W 36/0088* (2013.01)

(58) Field of Classification Search
None
See application file for complete search history.

(56) References Cited

U.S. PATENT DOCUMENTS

| | | | | |
|---|---|---|---|---|
| 8,811,993 B2* | 8/2014 | Alonso-Rubio | ............... | 370/312 |
| 2004/0121770 A1* | 6/2004 | Tigerstedt | ......... | H04W 36/0083 455/436 |
| 2015/0304891 A1* | 10/2015 | Dinan | ............... | H04W 36/0077 370/331 |

FOREIGN PATENT DOCUMENTS

EP    2 466 963 A1    6/2012

OTHER PUBLICATIONS

PCT Search Report, mailed Jun. 18, 2013, in connection with International Application No. PCT/SE2012/050921, all pages.
ITRI "Early RACH Access with Reserved Signatures for inter-eNB Handover" 3GPP TSG-RAN WG2 Meeting #57bis, St. Julian's, Malta, Mar. 26-30, 2011, R2-071379, pp. 1-4.

(Continued)

*Primary Examiner* — Adolf Dsouza
(74) *Attorney, Agent, or Firm* — Leffler Intellectual Property Law, PLLC (57) ABSTRACT

The present invention relates to a method in an RBS of a wireless network, for supporting HO of a UE in a served cell. The method comprises pre-allocating resources for HO of the UE to a target cell candidate. The pre-allocated resources comprise a dedicated preamble for the target cell candidate. The method also comprises receiving a measurement report from the UE triggering a HO and comprising a list of neighbor cells, determining if a cell in the list of neighbor cells corresponds to one of the at least one target cell candidates, and when they correspond transmitting a HO command to the UE comprising the dedicated preamble for the target. The present invention also relates to a corresponding method in the target RBS and to the serving and target RBS themselves.

12 Claims, 7 Drawing Sheets

(56) References Cited

OTHER PUBLICATIONS

ITRI "Performance Evaluation for Early UL Synchronization" 3GPP TSG-RAN WG2 Meeting #58bis, Orlando, USA, Jun. 25-29, 2007, Tdoc R2-072529, pp. 1-4.
3GPP TS 36.211 V10.3.0 "Evolved Universal Terrestrial Radio Access (E-UTRA); Physical Channels and Modulation" (Release 10), Sep. 2011, pp. 1-103.

* cited by examiner

METHODS AND NODES FOR FAST HANDOVER USING PRE-ALLOCATION OF RESOURCES IN TARGET NODES

TECHNICAL FIELD

The disclosure relates to handover, and more specifically to methods and radio base stations of a wireless network, for supporting handover of a user equipment. Both the radio base station controlling a serving cell of the user equipment, and the radio base station controlling a handover target cell candidate are addressed.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a wireless device such as a User Equipment (UE) is wirelessly connected to a Radio Base Station (RBS) commonly referred to as an evolved NodeB (eNodeB) in LTE. An RBS is a general term for a radio network node capable of transmitting radio signals to a UE and receiving signals transmitted by a UE. The eNodeB is a logical node in LTE and the RBS is a typical example of a physical implementation of an eNodeB.

Figure 1:
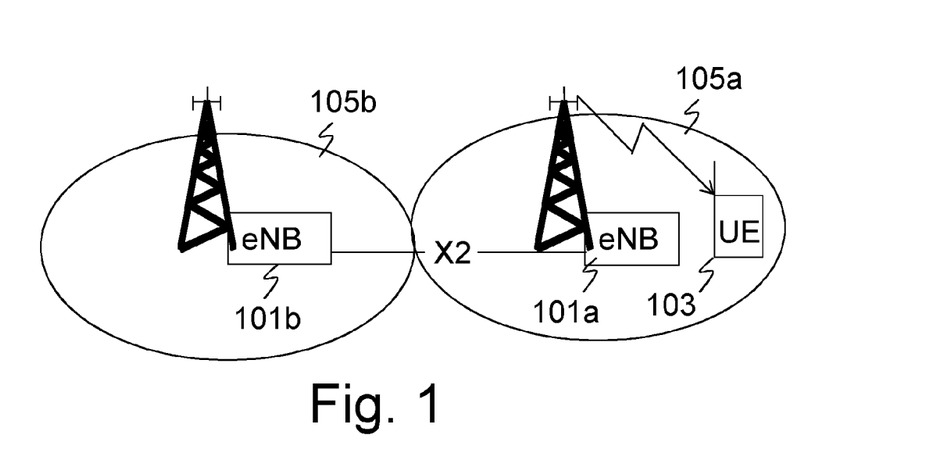
FIG. 1 is a schematic illustration of a radio access network in LTE.

FIG. 1 illustrates a radio access network in an LTE system. An eNodeB 101a serves a UE 103 located within the eNodeB's geographical area of service also called a cell 105a. The eNodeB 101a is directly connected to the core network. The eNodeB 101a is also connected via an X2 interface to a neighboring eNodeB 101b serving another cell 105b. Although the eNodeBs of this example network serves one cell each, an eNodeB may serve more than one cell.

Figure 2:
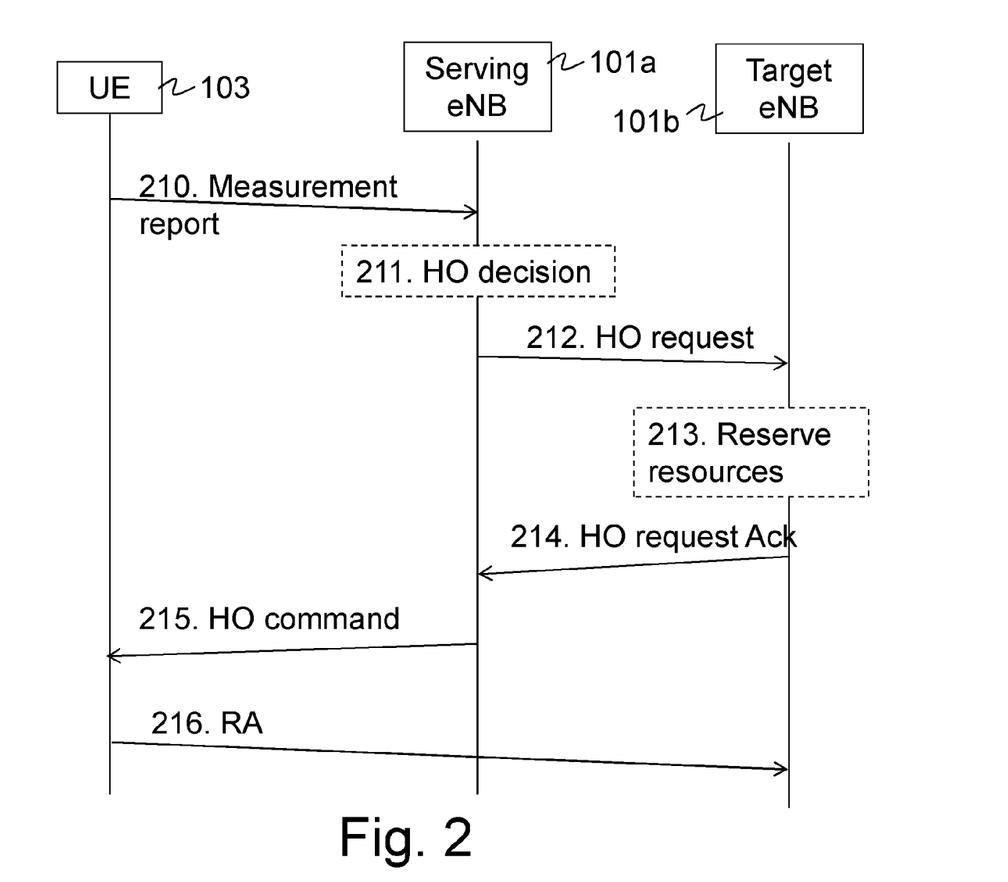
FIG. 2 is a signaling diagram schematically illustrating the HO procedure in an LTE system.

Robust and fast HandOver (HO) is one of the key technologies in an LTE system. An LTE HO is basically a hard HO, which means that there will be a user plane interruption when the UE is handed over from one serving cell to another. A fast HO is therefore beneficial for the data delivery. FIG. 2 is a signaling diagram schematically illustrating a HO procedure in the LTE system. The LTE HO procedure is initiated by the measurement report message 210 sent from the UE 103 to the serving eNodeB 101a. The measurement report triggers the HO of the UE, and is based on periodical channel quality measurements of the neighboring cells performed by the UE. The channel quality measurements are either Reference Signal Received Power (RSRP) measurements or Reference Signal Received Quality (RSRQ) measurements. When one of the measured neighboring cells has an RSRP or RSRQ which is higher than the RSRP or RSRQ of the cell serving the UE for a given time period, that neighboring cell is a candidate target cell for the HO of the UE, and the UE will report the cell and the corresponding measurements in the measurement report. The RSRP/RSRQ of the neighboring cell must exceed the RSRP/RSRQ of the serving cell with a certain amount of dB, corresponding to the hysteresis threshold, under the given time period, referred to as the time to trigger threshold. The measurement report may comprise measurements for more than one neighboring cell, sorted in the order of the channel quality.

The serving eNodeB 101a subsequently makes a HO decision 211 based on the measurement report. The eNodeB 101a selects one of the reported neighboring cells as the new serving cell also referred to as the target cell, and sends a HO request message 212, including the user context information to the target eNodeB 101b controlling the target cell over the X2 interface. If the target cell is not overloaded, the target eNodeB 101b will reserve resources in 213, and respond to the serving eNodeB 101a with a HO request acknowledgement (ACK) message 214 comprising a dedicated Random Access (RA) preamble to be used by the UE when accessing the target cell.

The time it takes from the sending of the X2 message referred to as the HO request 212, to the reception of the X2 message referred to as the HO request ACK 214, may be between 10 ms and 50 ms, depending on whether the HO is intra eNodeB or inter eNodeB. In some cases, if the first selected target cell is congested and the first target eNodeB thus replies to the HO request with a non-acknowledgement, the serving eNodeB 101a may have to resend the HO request 212 to another target eNodeB controlling another non-congested target cell. The total delay for the four X2 messages in this case may then be more than 100 ms.

Upon reception of the HO request ACK message 214, the serving eNodeB 101a will send a HO command 215 comprising the dedicated RA preamble to the UE 103. Thereafter, the UE 103 disconnects with the serving cell, and tries to access the target cell by sending a RA message 216 to the target eNodeB 101b using the RA preamble and by setting up the RRC connection.

The delay for the X2 HO signaling messages may thus take up to 100 ms when the selected target cell has no available resources for the new coming access. The reason for such long delay is that the serving eNodeB will have to try a second neighbor cell before it can secure resources for the UE. If also the second cell is congested, a third access may have to be performed. These extra delays will negatively impact the overall HO performance.

Figure 3:
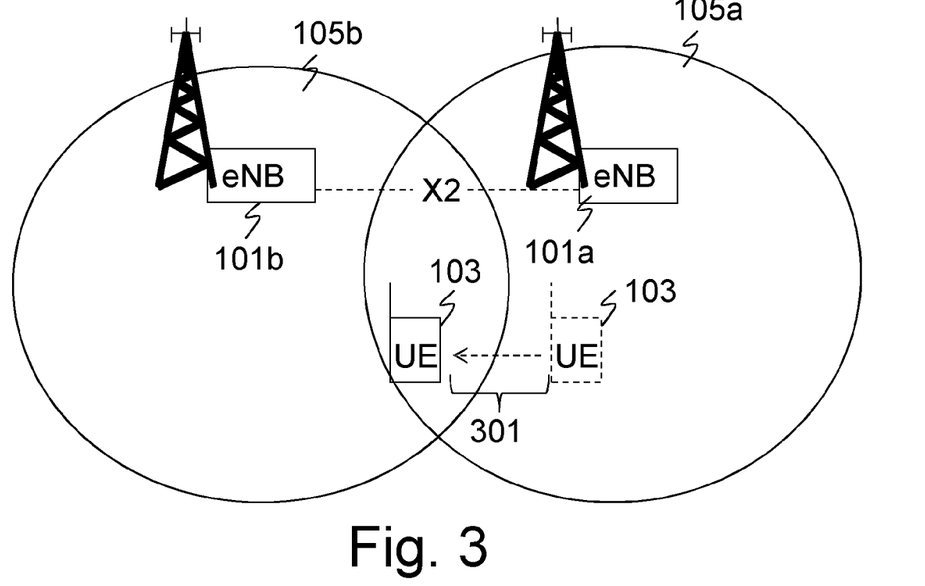
FIG. 3 is a schematic illustration of a possible effect of the X2 delay for HO.

FIG. 3 is a schematic illustration of a possible effect of an X2 delay. Because of the X2 delay in the HO procedure, the HO command message 215 is inevitably delayed. The UE 103 may thus be moving a certain distance 301 during the delay between the transmission of the measurement report triggering the HO and the reception of the HO command. This means that the UE may be close to the serving cell border when it is time for the serving eNodeB 101a to transmit the HO command. At the cell border the channel quality may be bad and may not support a reliable transfer of the HO command. Hence, this will increase the possibility of a HO failure due to a low quality HO command transmission. In heterogeneous network scenarios, HO events may be triggered much more frequently, and the above described problem may become even more severe.

Furthermore, it has been observed that HO performance would be degraded significantly when a Discontinuous Reception (DRX) feature is applied. In such a case, the UE cannot continuously measure the downlink channel quality, and the HO delay is much higher than the typical values. It is therefore believed that the above described problem will be even more severe when using DRX.

SUMMARY

It is therefore an object to address some of the problems outlined above, and to provide a solution making it possible to reduce the delay of the HO command which is due to the X2 HO signaling. This object and others are achieved by the methods and the RBSs according to the independent claims, and by the embodiments according to the dependent claims.

In accordance with a first aspect of the invention, a method in an RBS of a wireless network, for supporting HO of a UE is provided. The RBS controls the serving cell of the UE. The method comprises pre-allocating resources for HO of the UE to at least one target cell candidate. The pre-allocated resources comprises a dedicated random access preamble for each at least one target cell candidate. The method also comprises receiving a measurement report from the UE. The measurement report is triggering a HO of the UE and comprises a first list of neighbour cells. The method further comprises determining if a cell in the first list of neighbour cells corresponds to one of the at least one target cell candidates, and when the cell in the first list of neighbour cells corresponds to one of the at least one target cell candidates transmitting a HO command to the UE comprising the dedicated random access preamble for the corresponding target cell candidate.

In accordance with a second aspect of the invention, a method in an RBS of a wireless network, for supporting HO of a UE is provided. The RBS controls a target cell candidate for the HO. The method comprises receiving a request for HO of the UE to the target cell candidate. The request is received from an RBS controlling the cell serving the UE. The method also comprises determining whether there are available resources for the UE. The resources comprise a dedicated random access preamble for the target cell candidate. When there are available resources the method also comprises allocating the resources for the UE, initiating a timer when allocating the resources, and sending a response to the request. The response is sent to the RBS controlling the cell serving the UE, and comprises the dedicated random access preamble and an acknowledgement of the HO request.

In accordance with a third aspect of the invention, an RBS of a wireless network is provided, where the RBS is configured to control the serving cell of the UE. The RBS is configured to support HO of a UE. The RBS comprises a processing circuit, a receiver, and a transmitter. The processing circuit is configured to pre-allocate resources for HO of the UE to at least one target cell candidate, wherein the pre-allocated resources comprises a dedicated random access preamble for each at least one target cell candidate. The receiver is configured to receive a measurement report from the UE. The measurement report triggers a HO of the UE and comprises a first list of neighbour cells. The processing circuit is configured to determine if a cell in the first list of neighbour cells corresponds to one of the at least one target cell candidates. The transmitter is configured to transmit a HO command to the UE comprising the dedicated random access preamble for the corresponding target cell candidate, when the cell in the first list of neighbour cells corresponds to one of the at least one target cell candidates.

In accordance with a fourth aspect of the invention, an RBS of a wireless network is provided, where the RBS is configured to control a target cell candidate for the HO. The RBS is configured to support HO of a UE. The RBS comprises a communication unit, and a processing circuit. The communication unit is configured to receive a request for HO to the target cell candidate for the UE, from an RBS controlling the cell serving the UE. The processing circuit is configured to determine whether there are available resources for the UE, the resources comprising a dedicated random access preamble for the target cell candidate. The processing circuit is further configured to allocate the resources for the UE when there are available resources, and to initiate a timer when allocating the resources. The communication unit is further configured to send a response to the request to the RBS controlling the cell serving the UE, the response comprising the dedicated random access preamble and an acknowledgement of the HO request.

An advantage of embodiments of the invention is that the HO delay is reduced, which will allow for an enhanced user experience.

Another advantage of embodiments of the invention is a decreased number of HO failures due to low quality HO command transmissions, which will allow for good HO success statistics.

Other objects, advantages and features of embodiments will be explained in the following detailed description when considered in conjunction with the accompanying drawings and claims.

DETAILED DESCRIPTION

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of methods and nodes, they may also be embodied in a computer program product as well as in a system comprising a computer processor and a memory coupled to the processor, wherein the memory is encoded with one or more programs that may perform the functions disclosed herein.

Embodiments are described in a non-limiting general context in relation to an example scenario a UE performing an inter-eNodeB HO in E-UTRAN. However, it should be noted that the embodiments may be applied to any radio access network technology supporting a hard HO procedure similar to the E-UTRAN HO procedure. Furthermore, the embodiments may also be applied to an intra-eNodeB HO procedure, where the serving eNodeB is the same as the target eNodeB as the serving eNodeB is also in control of the target cell.

The problem of the delay between the transmission of the HO measurement report and the reception of the HO command is addressed by a solution where resources in target cell candidates are pre-allocated for a HO of the UE. The UE context and the dedicated preambles are thus reserved before the HO is triggered by the regular measurement report. By pre-allocating resources for the HO, the HO command can be sent directly when the regular measurement report triggering the HO is received at the serving eNodeB. The objective of embodiments of the present invention is to achieve a fast HO procedure by avoiding or at least reducing the delay for the X2 HO signaling messages.

The actual HO procedure is preceded by communication between the serving eNodeB and potential target eNodeBs to check the admission possibility in the target cell candidates and to reserve resources where possible. The resources that are reserved or pre-allocated comprise a dedicated RA preamble for the coming access. This resource reservation may be done in advance of the point in time when the serving eNodeB makes the final HO decision.

The serving eNodeB selects one or more target cell candidates in advance and reserves the resources in these target cell candidates during a certain time period determined by a pre-defined timer. If a measurement report indicating possible target cells is received from the UE before the pre-defined timer has expired, the serving eNodeB will make a HO decision and send the HO command to the UE directly after reception of the measurement report. The other target cell candidates may release the reserved resources when the pre-defined timer expires.

There are two alternative embodiments A and B for determining in which target cell candidates to perform the pre-allocation of resources, as described hereinafter.

Figure 4A:
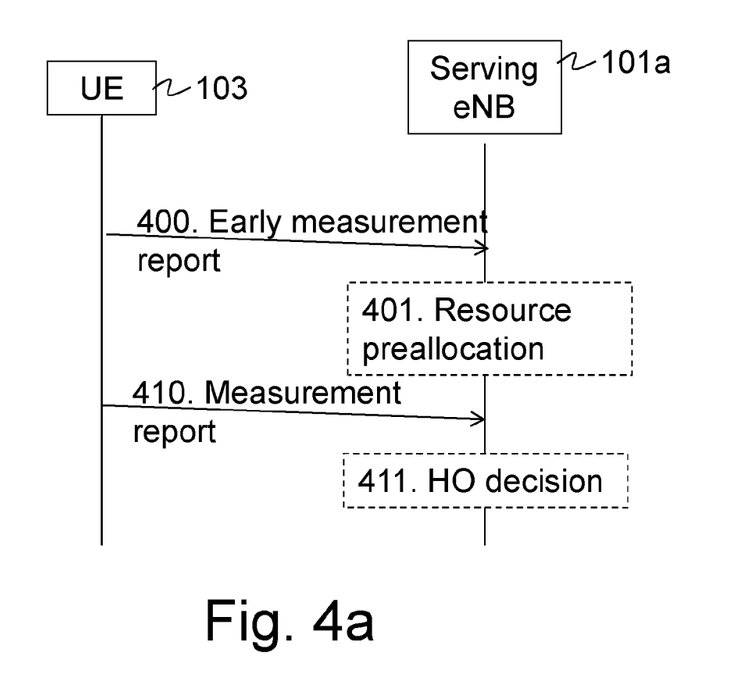
FIGS. 4a-b are signaling diagrams schematically illustrating the HO signaling according to embodiments of the invention.

Embodiment A: Target Cell Candidates Selected Based on an Early Ho Measurement Report Embodiment A is schematically illustrated in the signaling diagram in FIG. 4a. In embodiment A the UE 103 sends an early measurement report in 400. This early measurement report can be triggered based on a different hysteresis threshold and/or time to trigger threshold than the second measurement report sent in 410 triggered by the ordinary thresholds. The early measurement report in 400 is more easily triggered than the regular measurement report in 410, and the early measurement report is the message triggering the pre-allocation of resources 401. The regular measurement report in 410 triggers the actual HO and the final HO decision 411, as already described in the background section.

The early measurement report can be triggered by HO thresholds, such as a lower hysteresis threshold than the hysteresis threshold used to trigger the regular measurement report, and/or a shorter time to trigger than the ordinary time to trigger. The early measurement report may include one or more neighboring cells fulfilling the threshold comparisons, in order of decreasing channel quality.

The regular measurement report will be triggered based on the ordinary HO settings for the hysteresis and time to trigger, and will thus be received after the early measurement report in time. If the neighbor cell list in the regular measurement report does not change from the early report, a short report including the message header and some necessary information elements may be transmitted instead of the full measurement report. In another alternative embodiment, a short measurement report including only the identities of the altered neighbor cells and the priority indexes will be transmitted instead of the full regular measurement report. When the serving eNodeB gets the second measurement report triggering the HO, the eNodeB will make the HO decision based on the received second measurement report combined with the early measurement report.

Several options are possible for the configuration of the threshold settings for the triggering of the early measurement report. A typical solution would be that the network configures the settings separately for both reports. A UE would keep only one setting at a time. The setting specified for the triggering of the early measurement report is sent to the UEs before the pre-allocation of HO resources. Another setting specified for the triggering of the second measurement report is sent to the UEs after the pre-allocation. The settings can be updated by the network using dedicated RRC signaling or broadcasted system information. Such an alternative would be simple, although it may create a high signaling overhead. To avoid the extra signaling overhead, another alternative is to let the UE store the two different settings. The setting used to trigger the early measurement report may in still another embodiment be hard coded. The network is then only required to inform the UEs of the setting for the second measurement report. This means that there would be no changes required related to the RRC signaling of measurement report settings.

Embodiment B: Target Cell Candidates Selected Without Early Measurement Report

In embodiment B, the serving eNodeB selects target cell candidates itself for a specific UE. This is done based on an estimation for this UE. The selection of target cell candidates according to embodiment B may be used e.g. if there is no recent measurement report.

In embodiment B, the target cell candidates will be selected by the serving eNodeB without the reception of a UE measurement report. The selection can be done for a specific UE based on historical statistics, related to previous HOs of this UE at this position, or to previous HOs of other UEs at this position. This means that it may be needed to apply positioning techniques in order to determine the position of the UE. Some examples of such positioning techniques are GPS positioning, or path gain based positioning.

Resource Pre-Allocation in the Target Cell Candidates

Upon the selection of the potential target cells or the target cell candidates, either based on the eNodeBs own selection according to embodiment B, or based on an early measurement report according to embodiment A, some resources will be pre-allocated in the target cells. The pre-selected target cell candidates may include more than one cell and consequently, the serving eNodeB has to access them one by one to check resource availability and to reserve resources. The procedure follows the standardized X2 message exchange, and is schematically illustrated in the signaling diagram of FIG. 4b. First, the serving eNodeB 101a transmits a HO request in 412 including UE context information to an eNodeB controlling a first target cell candidate, in the FIG. 4b referred to as eNodeB candidate1 with reference number 461. The eNodeB candidate1 checks the admission feasibility and reserves resources 413 if a new UE can be admitted. Subsequently, a HO request ACK message including the pre-allocated dedicated RA preamble will be returned in 414 to the serving eNodeB 101a. This procedure is then repeated for eNodeB candidate2 with reference number 462 controlling a second target cell candidate, and may of course be repeated for even further eNodeB candidates.

Figure 4B:
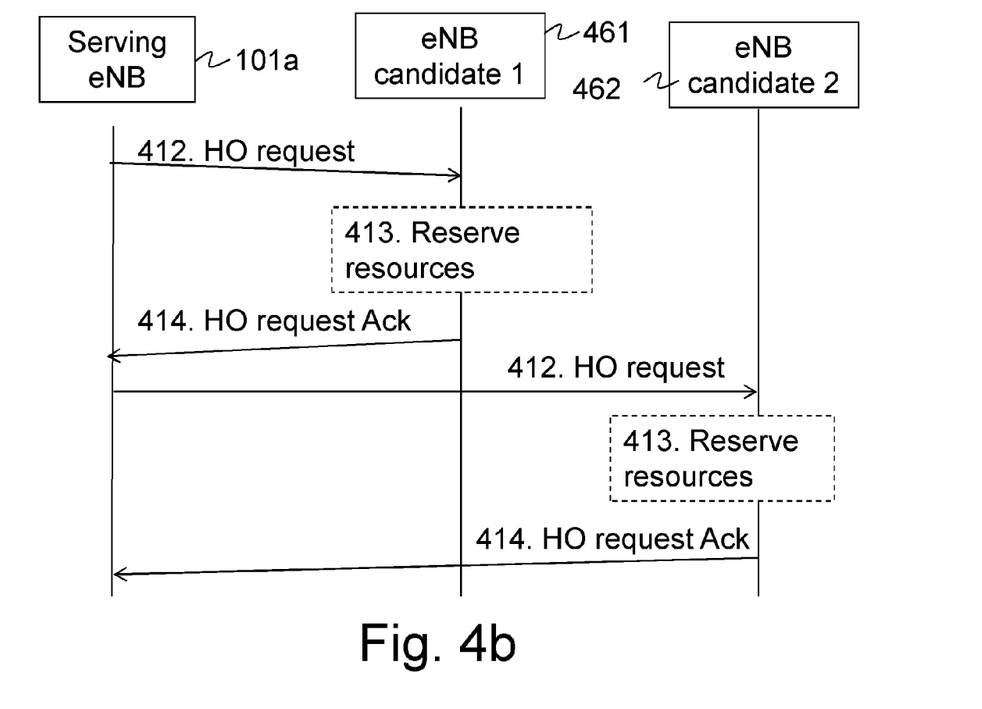

As an addition to the ordinary X2 procedure and according to one embodiment, a timer will be started in the eNodeB candidates 461, 462, when the pre-allocation of resources is initiated. A RA request using the allocated dedicated preamble should arrive from the UE before this timer has expired in order for the HO procedure to be successful. If the timer expires before the reception of the RA, the reserved resources will be released.

In one embodiment, a time of HO activation may be included in the HO request ACK message in 414 to indicate the expected HO execution time. This information could be used by the serving eNodeB to secure that the HO command is sent to the UE before the time of HO activation has expired. If the time of HO activation has expired, the pre-allocated resources may have been released by the target eNodeB, and a conventional HO procedure with reservation of resources after the HO decision will have to be performed instead.

Final HO Decision

Figure 5:
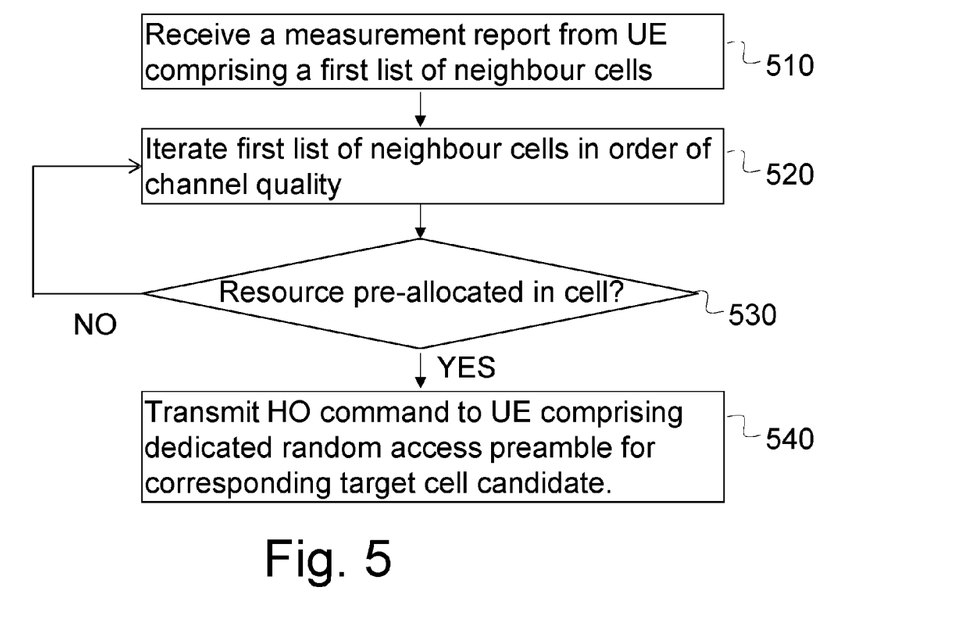
FIG. 5 is a flowchart illustrating the method in the serving eNodeB according to embodiments.

As illustrated in the flowchart in FIG. 5, the serving eNodeB receives, in 510, the measurement report with a first neighbor cell list from the UE which triggers the HO procedure. The eNodeB iterates, in 520, the first neighbor cell list received in the measurement report in order of decreasing channel quality. For a neighbor cell of the first list, the eNodeB checks whether or not resources for the HO have been allocated in advance in 530. If no resources have been pre-allocated, the next cell in the first list of neighbor cells is checked in 520 and 530. When a target neighbor cell with pre-allocated resources is found, the eNodeB will transmit the HO command to the UE, in 540, comprising the pre-allocated dedicated preamble for the corresponding target neighbor cell. If the first N best cells are not pre-allocated, where N is pre-defined, a conventional HO procedure may be executed. The serving eNodeB will thus transmit the X2 HO command to the neighbor cell with best channel quality and with pre-allocated resources.

The HO delay reduction allowed by implementing embodiments of the invention improves the HO performance, especially in heterogeneous network deployments and in networks applying DRX.

Figure 6A:
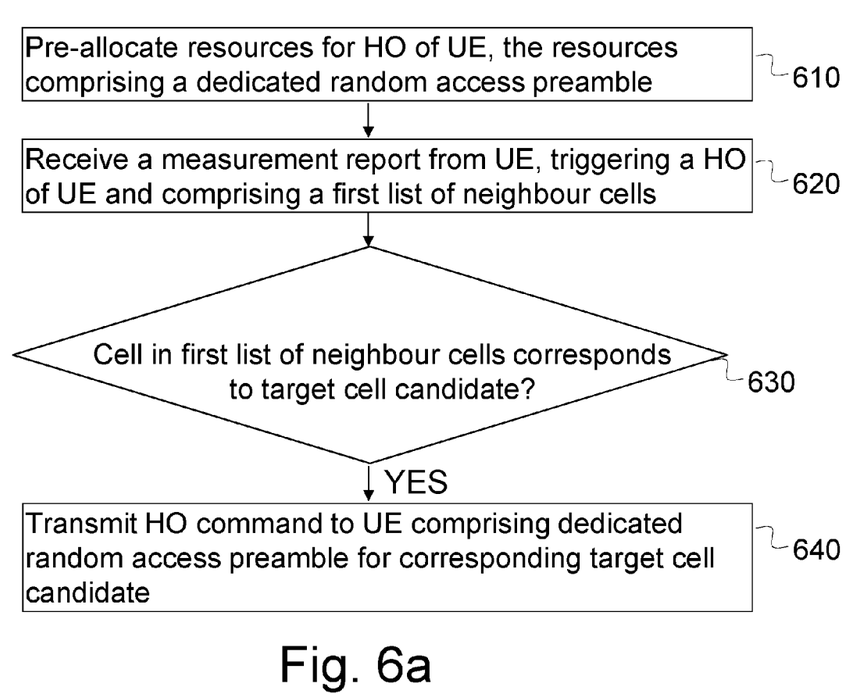
FIGS. 6a-6d are flowcharts illustrating the method in the serving RBS according to embodiments.

FIG. 6a is a flowchart illustrating an embodiment of a method performed in an RBS of a wireless network, for supporting HO of a UE. The RBS controls the serving cell of the UE. The RBS may in one embodiment be an eNodeB of an LTE network. The method comprises:
- 610: Pre-allocating resources for HO of the UE to one or more target cell candidates. The pre-allocated resources comprise a dedicated random access preamble for each target cell candidate. By pre-allocating resources for the HO, the HO delays may be reduced.
- 620: Receiving a measurement report from the UE, the measurement report triggering a HO of the UE and comprising a first list of neighbour cells.
- 630: Determining if a cell in the first list of neighbour cells corresponds to one of the target cell candidates. It has to be checked that there are pre-allocated resources for HO to the neighbour cells in the measurement report.
- 640: Transmitting a HO command to the UE comprising the dedicated random access preamble for the corresponding target cell candidate when the cell in the first list of neighbour cells corresponds to one of the target cell candidates. If there is a match between cells for which resources have been pre-allocated and cells in the measurement report, the HO command can be sent directly to the UE at this stage, and the conventional HO delays may be avoided.

Figure 6B:
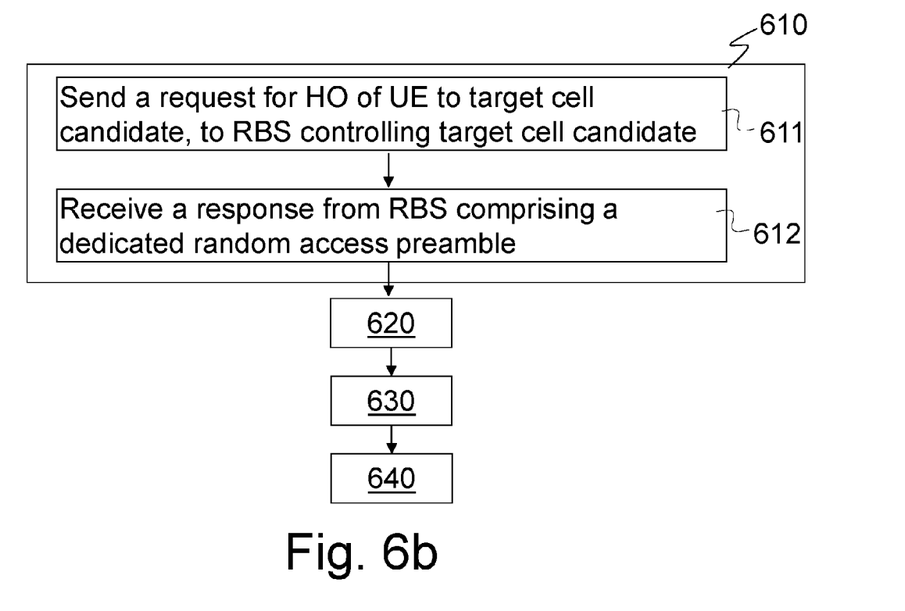

FIG. 6b is a flowchart illustrating another embodiment of the method performed in the RBS controlling the serving cell of the UE. The step of pre-allocating 610 resources for HO of the UE to the at least one target cell candidate comprises for each of a plurality of target cell candidates:
- 611: Sending a request for HO of the UE to the target cell candidate. The request is sent to an RBS controlling the target cell candidate.
- 612: Receiving a response from the RBS controlling the target cell candidate when the HO request is acknowledged. The response comprises a dedicated random access preamble.

The method also comprises the further steps 620, 630 and 640 already described above with reference to FIG. 6a. In one embodiment, the received response in 612 further comprises a time of HO activation. The HO command is transmitted in 640 only if the measurement report is received within the time of HO activation counted from the pre-allocation of resources in 610. In this way it is secured that the RBS does not send the HO command to a UE with a preamble that is no longer pre-allocated for this UE.

Figure 6C:
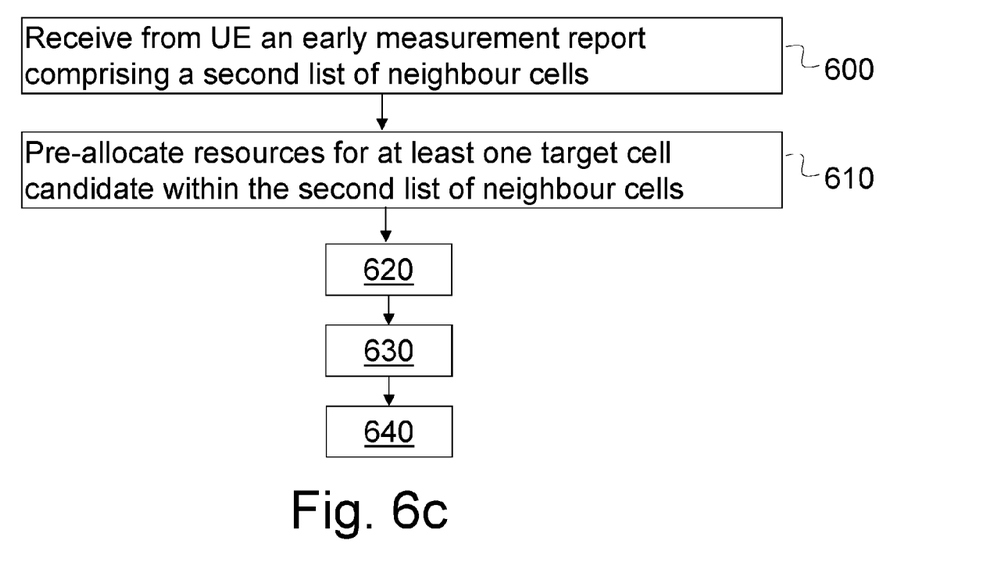

FIG. 6c is a flowchart illustrating still another embodiment of the method performed in the RBS controlling the serving cell of the UE, which may be combined with any of the embodiments described above with reference to FIGS. 6a-b. The illustrated embodiment corresponds to embodiment A described previously. The method is preceded by the following:
- 600: Receiving an early measurement report from the UE, the early measurement report triggering the pre-allocation of resources and comprising a second list of neighbour cells. This early measurement report thus corresponds to the early measurement report in message 400 in FIG. 4a described previously.

In this embodiment resources for HO of the UE are pre-allocated 610, for at least one target cell candidate within the second list of neighbour cells. The method also comprises the further steps 620, 630 and 640 already described above with reference to FIG. 6a. In one embodiment, the measurement report triggering the HO received in 620, comprise only updated information relative to the early measurement report received in 600, triggering the pre-allocation of resources.

Figure 6D:
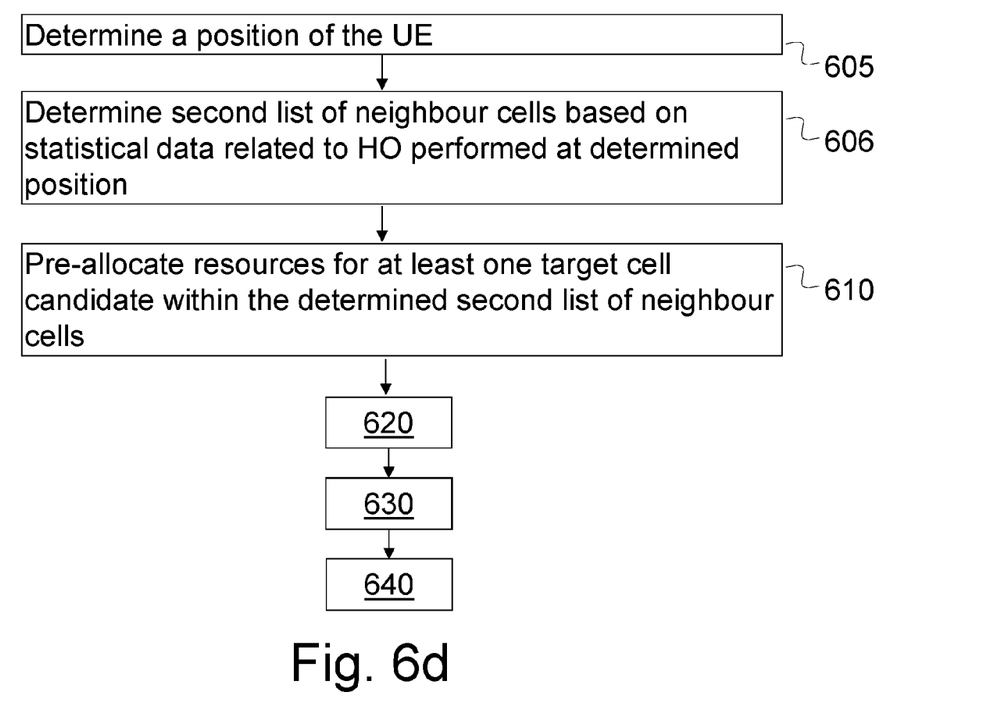

FIG. 6d is a flowchart illustrating an alternative embodiment corresponding to embodiment B described previously. The method is preceded by the following:
- 605: Determining a position of the UE.
- 606: Determining a second list of neighbour cells based on statistical data related to HOs performed at the determined position.

Resources for HO of the UE are in this embodiment pre-allocated 610 for at least one target cell candidate within the determined second list of neighbour cells. The method also comprises the further steps 620, 630 and 640 already described above with reference to FIG. 6a.

Figure 7:
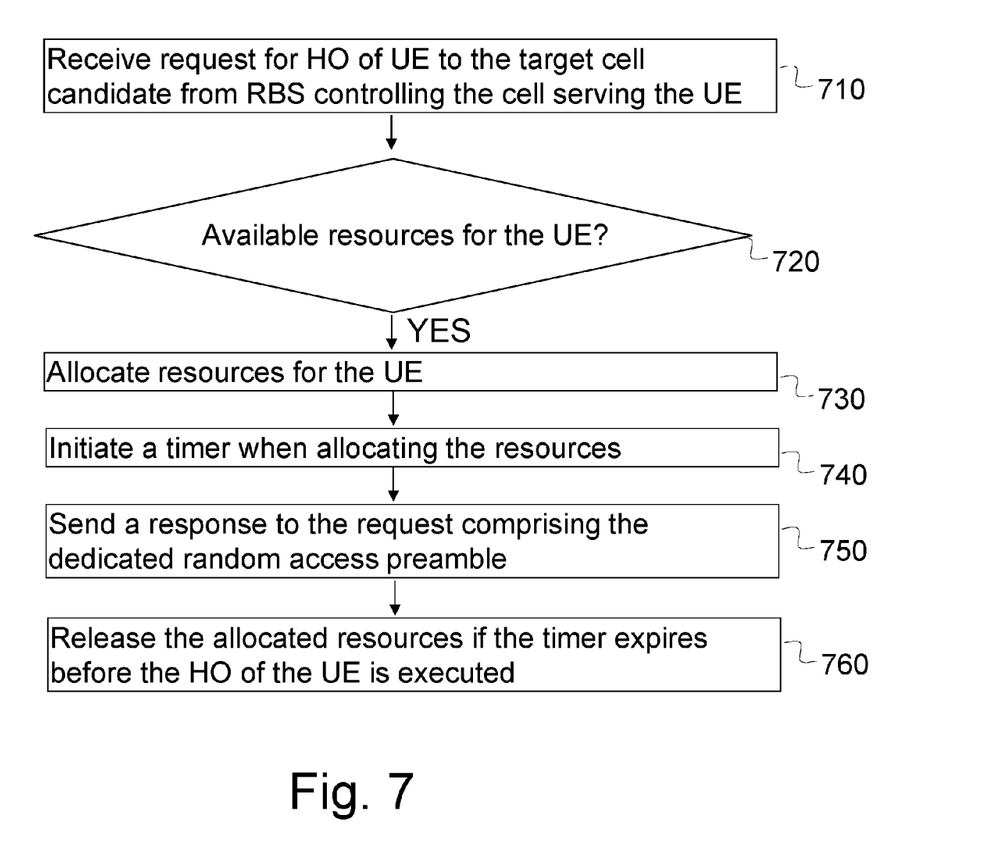
FIG. 7 is a flowchart illustrating the method in the target eNodeB according to embodiments.

FIG. 7 is a flowchart illustrating an embodiment of a method in an RBS of a wireless network for supporting HO of a UE, where the RBS controls a target cell candidate for the HO. The method comprises:
- 710: Receiving a request for HO of the UE to the target cell candidate. The request is received from an RBS controlling the cell serving the UE.

720: Determining whether there are available resources for the UE, the resources comprising a dedicated random access preamble for the target cell candidate, 730: Allocating the resources for the UE when there are available resources.

740: Initiating a timer when allocating the resources.

750: Sending a response to the request to the RBS controlling the cell serving the UE. The response comprises the dedicated random access preamble. The response is the acknowledgement of the HO request. The response may further comprise a time of HO activation indicating the expected HO execution time.

Step 710 corresponds to message 412 in FIG. 4b, steps 720 and 730 corresponds to 413, and step 750 corresponds to message 414. In one embodiment of the invention the method further comprises:

760: Releasing the allocated resources if the timer expires before the HO of the UE to the target cell candidate is initiated. The timer thus secures that the resources are released if they are not used for the HO.

Figure 8:
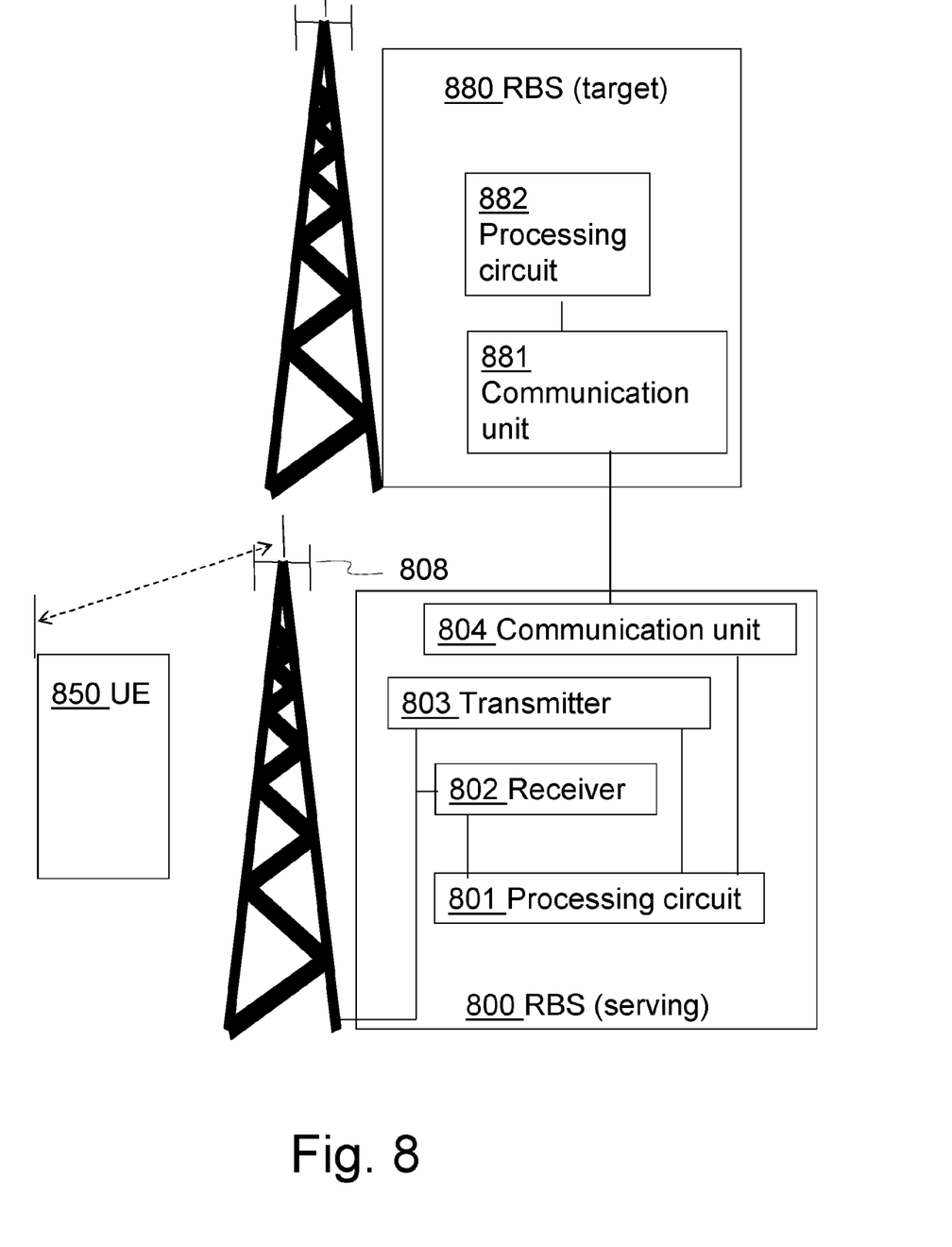
FIG. 8 is a block diagram schematically illustrating serving and target eNodeB according to embodiments.

An embodiment of an RBS 800 of a wireless network, configured to support HO of a UE 850 and to control the serving cell of the UE is schematically illustrated in the block diagram in FIG. 8. The RBS 800 comprises a processing circuit 801, a receiver 802, and a transmitter 803. The receiver 802 and the transmitter 803 are connected to one or more antennas 808 via one or more antenna ports. The processing circuit 801 is configured to pre-allocate resources for HO of the UE to one or more target cell candidates. The pre-allocated resources comprise a dedicated random access preamble for each target cell candidate. The receiver 802 is configured to receive a measurement report from the UE. The measurement report triggers a HO of the UE and comprises a first list of neighbour cells. The processing circuit 801 is also configured to determine if a cell in the first list of neighbour cells corresponds to one of the target cell candidates. The transmitter 803 is configured to transmit a HO command to the UE comprising the dedicated random access preamble for the corresponding target cell candidate, when the cell in the first list of neighbour cells corresponds to one of the at least one target cell candidates.

In one embodiment, the RBS 800 further comprises a communication unit 804 configured to, for each of a plurality of target cell candidates, send a request for HO of the UE to the target cell candidate. The request is sent to an RBS controlling the target cell candidate. The communication unit 804 is further configured to receive a response from the RBS controlling the target cell candidate, where the response comprises a dedicated random access preamble.

In one embodiment, the response may further comprise a time of activation indicating an expected HO execution time. The transmitter 803 is then configured to transmit the HO command only if the measurement report is received within the time of HO activation counted from the pre-allocation of resources by the processing circuit 801.

In another embodiment, corresponding to embodiment A described previously, the receiver 802 is further configured to receive an early measurement report from the UE. The early measurement report triggers the pre-allocation of resources and comprises a second list of neighbour cells. The measurement report triggering the HO may in this embodiment A comprise only updated information relative to the early measurement report triggering the pre-allocation of resources. The processing circuit 801 is in embodiment A configured to pre-allocate resources for HO of the UE for one or more target cell candidates within the second list of neighbour cells.

In an alternative embodiment, corresponding to embodiment B described previously, the processing circuit 801 is further configured to determine a position of the UE, determine a second list of neighbour cells based on statistical data related to HOs performed at the determined position, and pre-allocate resources for HO of the UE for one or more target cell candidates within the determined second list of neighbour cells.

An embodiment of an RBS 880 of a wireless network, configured to support HO of a UE 850 and to control a target cell candidate for the HO is also schematically illustrated in the block diagram in FIG. 8. The RBS 880 comprises a communication unit 881, and a processing circuit 882. The communication unit 881 is configured to receive a request for HO to the target cell candidate for the UE, from the RBS 800 controlling the cell serving the UE 850. The processing circuit 882 is configured to determine whether there are available resources for the UE. The resources comprise a dedicated random access preamble for the target cell candidate. The processing circuit 882 is further configured to allocate the resources for the UE when there are available resources, and to initiate a timer when allocating the resources. The communication unit 881 is further configured to send a response to the request to the RBS 800 controlling the cell serving the UE 850. The response comprises the dedicated random access preamble.

In one embodiment, the communication unit 881 is further configured to release the allocated resources when the timer expires before the HO of the UE to the target cell candidate is initiated.

The response comprises in one embodiment a time of HO activation indicating the expected HO execution time.

In an alternative way to describe the embodiments in FIG. 8, the RBSs 800 and 880 both comprise a Central Processing Unit (CPU) which may be a single unit or a plurality of units. Furthermore, each RBS 800 and 880 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the RBS causes the CPU to perform steps of the procedure described earlier in conjunction with FIGS. 6a-d and 7. In other words, when said code means are run on the CPU, they correspond to the processing circuits 801 and 882 in the respective RBSs 800 and 880 of FIG. 8.

The above mentioned and described embodiments are only given as examples and should not be limiting. Other solutions, uses, objectives, and functions within the scope of the accompanying patent claims may be possible.

The invention claimed is:

1. A method in a radio base station of a wireless network, for supporting handover of a user equipment, wherein the radio base station controls the serving cell of the user equipment, the method comprising:

pre-allocating resources for handover of the user equipment to at least one target cell candidate, wherein the pre-allocated resources comprise a dedicated random access preamble for each at least one target cell candidate;

receiving a measurement report from the user equipment, the measurement report triggering a handover of the user equipment and comprising a first list of neighbour cells;

determining if a cell in the first list of neighbour cells corresponds to one of the at least one target cell candidates;

and when the cell in the first list of neighbour cells corresponds to one of the at least one target cell candidates:
  transmitting a handover command to the user equipment comprising the dedicated random access preamble for the corresponding target cell candidate,
  wherein pre-allocating resources for handover of the user equipment to the at least one target cell candidate comprises for each of a plurality of target cell candidates:
    sending a request for handover of the user equipment to the target cell candidate, wherein the request is sent to a radio base station controlling the target cell candidate;
  and when the handover request is acknowledged:
    receiving a response from the radio base station controlling the target cell candidate, the response comprising a time of handover activation, and wherein the handover command is transmitted only if the measurement report is received within the time of handover activation counted from the pre-allocation of resources.

2. The method according to claim 1, wherein the response comprises the dedicated random access preamble.

3. The method according to claim 1, preceded by:
  receiving an early measurement report from the user equipment, the early measurement report triggering the pre-allocation of resources and comprising a second list of neighbour cells;
and wherein resources for handover of the user equipment are pre-allocated for at least one target cell candidate within the second list of neighbour cells.

4. The method according to claim 3, wherein the measurement report triggering the handover comprises only updated information relative to the early measurement report triggering the pre-allocation of resources.

5. The method according to claim 1, preceded by:
  determining a position of the user equipment; and
  determining a second list of neighbour cells based on statistical data related to handovers performed at the determined position,
  wherein resources for handover of the user equipment are pre-allocated for at least one target cell candidate within the determined second list of neighbour cells.

6. A method in a radio base station of a wireless network, for supporting handover of a user equipment, wherein the radio base station controls a target cell candidate for the handover, the method comprising:
  receiving a request for handover of the user equipment to the target cell candidate, wherein the request is received from a radio base station controlling the cell serving the user equipment;
  determining whether there are available resources for the user equipment, the resources comprising a dedicated random access preamble for the target cell candidate;
  and when there are available resources:
  allocating the resources for the user equipment;
  initiating a timer when allocating the resources; and
  sending a response to the request, to the radio base station controlling the cell serving the user equipment, the response comprising the dedicated random access preamble,
  wherein the sent response further comprises a time of handover activation that corresponds to an initial setting of the timer,
  and wherein the method further comprises:
    releasing the allocated resources if the timer expires before the handover of the user equipment to the target cell candidate is initiated.

7. A radio base station of a wireless network, configured to support handover of a user equipment and to control the serving cell of the user equipment, the radio base station comprising:
  a processing circuit;
  a receiver; and
  a transmitter,
  wherein:
    the processing circuit is configured to pre-allocate resources for handover of the user equipment to at least one target cell candidate, wherein the pre-allocated resources comprise a dedicated random access preamble for each at least one target cell candidate;
    the receiver is configured to receive a measurement report from the user equipment, the measurement report triggering a handover of the user equipment and comprising a first list of neighbour cells;
    the processing circuit is configured to determine if a cell in the first list of neighbour cells corresponds to one of the at least one target cell candidates; and
    the transmitter is configured to transmit a handover command to the user equipment comprising the dedicated random access preamble for the corresponding target cell candidate, when the cell in the first list of neighbour cells corresponds to one of the at least one target cell candidates,
    wherein the radio base station further comprises a communication unit configured to, for each of a plurality of target cell candidates, send a request for handover of the user equipment to the target cell candidate, wherein the request is sent to a radio base station controlling the target cell candidate, and the communication unit being further configured to receive a response from the radio base station controlling the target cell candidate, the response comprising a time of activation indicating an expected handover execution time, and wherein the transmitter is configured to transmit the handover command only if the measurement report is received within the time of handover activation counted from the pre-allocation of resources by the processing circuit.

8. The radio base station according to claim 7, wherein the response comprises a dedicated random access preamble.

9. The radio base station according to claim 7, wherein the receiver is further configured to receive an early measurement report from the user equipment, the early measurement report triggering the pre-allocation of resources and comprising a second list of neighbour cells, and wherein the processing circuit is configured to pre-allocate resources for handover of the user equipment, for at least one target cell candidate within the second list of neighbour cells.

10. The radio base station according to claim 9, wherein the measurement report triggering the handover comprises only updated information relative to the early measurement report triggering the pre-allocation of resources.

11. The radio base station according to claim 7, wherein the processing circuit is further configured to:
  determine a position of the user equipment;
  determine a second list of neighbour cells based on statistical data related to handovers performed at the determined position; and
  pre-allocate resources for handover of the user equipment, for at least one target cell candidate within the determined second list of neighbour cells.

12. A radio base station of a wireless network configured to support handover of a user equipment and to control a target cell candidate for the handover, the radio base station comprising:
- a communication unit; and
- a processing circuit, wherein:
- the communication unit is configured to receive a request for handover to the target cell candidate for the user equipment, from a radio base station controlling the cell serving the user equipment;
- the processing circuit is configured to determine whether there are available resources for the user equipment, the resources comprising a dedicated random access preamble for the target cell candidate;
- the processing circuit is further configured to allocate the resources for the user equipment when there are available resources;
- the processing circuit is further configured to initiate a timer when allocating the resources; and
- the communication unit is further configured to send a response to the request to the radio base station controlling the cell serving the user equipment, the response comprising the dedicated random access preamble,
- wherein the response further comprises a time of handover activation that corresponds to an initial setting of the timer,
- and wherein the communication unit is further configured to release the allocated resources when the timer expires before the handover of the user equipment to the target cell candidate is initiated.

* * * * *